US012806815B2

(12) United States Patent
Kvapil et al.

(10) Patent No.: US 12,806,815 B2
(45) Date of Patent: Nov. 24, 2026

(54) POWER TOOL GUIDE AND POWER TOOL GUIDE ASSEMBLY

(71) Applicant: Black & Decker Inc., New Britain, CT (US)

(72) Inventors: Vaclav Kvapil, Teplice (CZ); Katarina Kurajdova, Udica (SK)

(73) Assignee: Black & Decker Inc., New Britain, CT (US)

(*) Notice: Subject to any disclaimer, the term of this patent is extended or adjusted under 35 U.S.C. 154(b) by 273 days.

(21) Appl. No.: 18/323,105

(22) Filed: May 24, 2023

(65) Prior Publication Data

US 2023/0382000 A1 Nov. 30, 2023

(30) Foreign Application Priority Data

May 24, 2022 (GB) ..................................... 2207590
Jun. 28, 2022 (GB) ..................................... 2209457

(51) Int. Cl.
*B27B 9/04* (2006.01)
*B23D 47/02* (2006.01)

(52) U.S. Cl.
CPC ................ *B27B 9/04* (2013.01); *B23D 47/02* (2013.01)

(58) Field of Classification Search
CPC ............ B27B 9/04; B23D 47/02; B23D 59/00
See application file for complete search history.

(56) References Cited

U.S. PATENT DOCUMENTS 3,211,481 A * 10/1965 Cadovius ........... A47B 47/0008 403/171
3,218,097 A * 11/1965 Bowers ................... F16B 7/025 403/295
3,830,130 A 8/1974 Moore
3,915,045 A 10/1975 Kitzman
4,084,746 A 4/1978 Cheng
4,106,695 A 8/1978 Carella et al.
4,179,066 A 12/1979 Teter
4,231,517 A 11/1980 Cheng
(Continued)

FOREIGN PATENT DOCUMENTS

CA 2540229 A1 9/2007
CA 2843348 A1 8/2015
(Continued)

OTHER PUBLICATIONS

EP_2672042_A2 (Year: 2013).*
(Continued)

*Primary Examiner* — Jonathan G Riley
(74) *Attorney, Agent, or Firm* — Brake Hughes Bellermann LLP

(57) ABSTRACT

A power tool guide comprises an elongate body having a workpiece side configured to engage a workpiece and a power tool side configured to engage a power tool. At least one elongate rail is mounted on the power tool side and the at least one elongate rail is configured to engage a reciprocal channel in the power tool and limit lateral movement of the power tool in a direction perpendicular to a longitudinal axis of the elongate body. Wherein the at least one elongate rail comprises a first width at a first position at a first longitudinal end of the elongate body and a second width at a second position remote from the first longitudinal end of the elongate body.

20 Claims, 13 Drawing Sheets

(56) References Cited

U.S. PATENT DOCUMENTS

| | | | | |
|---|---|---|---|---|
| 4,286,752 | A | 9/1981 | Cheng | |
| 4,463,644 | A | 8/1984 | Ferdinand et al. | |
| 5,127,762 | A * | 7/1992 | Havlovitz | F16B 7/042 403/328 |
| 5,138,759 | A | 8/1992 | Gruetzmacher | |
| 5,479,733 | A | 1/1996 | Kusina | |
| 5,687,649 | A | 11/1997 | Koeninger et al. | |
| 6,062,122 | A | 5/2000 | Niemczyk | |
| 6,568,873 | B1 * | 5/2003 | Peterson | E06B 3/667 403/301 |
| 6,675,545 | B2 * | 1/2004 | Chen | B29C 66/72328 52/309.1 |
| 6,712,543 | B1 | 3/2004 | Schmalzhofer | |
| 7,021,019 | B2 * | 4/2006 | Knauseder | E04F 15/04 24/297 |
| 7,165,334 | B2 | 1/2007 | Ben-gigi | |
| 7,610,839 | B1 | 11/2009 | Bessette | |
| 7,866,098 | B2 * | 1/2011 | Cinnamon | F24S 25/67 52/173.3 |
| 8,230,611 | B1 | 7/2012 | Emerson | |
| 8,356,446 | B2 | 1/2013 | Takeda et al. | |
| 8,800,416 | B2 * | 8/2014 | Xing | B25H 1/0078 238/10 F |
| 9,004,715 | B1 | 4/2015 | Litke et al. | |
| 9,010,067 | B2 * | 4/2015 | Baker | E04F 15/04 52/391 |
| 9,156,184 | B2 | 10/2015 | Stoffel | |
| 9,322,421 | B2 * | 4/2016 | Baker | F16B 5/002 |
| 9,815,177 | B2 | 11/2017 | Ursell et al. | |
| 10,662,650 | B2 | 5/2020 | Lacroix et al. | |
| 11,325,215 | B1 | 5/2022 | Clark | |
| 11,883,891 | B2 | 1/2024 | Hall | |
| 12,083,613 | B2 | 9/2024 | Dutterer | |
| 12,172,259 | B2 | 12/2024 | Hoff et al. | |
| 2003/0233922 | A1 | 12/2003 | Makropoulos | |
| 2003/0233926 | A1 | 12/2003 | Makropoulos | |
| 2009/0308218 | A1 | 12/2009 | Raff et al. | |
| 2011/0083540 | A1 | 4/2011 | Xing et al. | |
| 2011/0194886 | A1 * | 8/2011 | Wu | E06B 3/9641 403/23 |
| 2012/0079931 | A1 * | 4/2012 | Hansen | B23D 47/02 83/508.2 |
| 2013/0118332 | A1 | 5/2013 | Barnes | |
| 2013/0247738 | A1 * | 9/2013 | Stoffel | B27B 9/04 29/468 |
| 2015/0283679 | A1 * | 10/2015 | Ursell | B25B 5/085 269/147 |
| 2018/0207833 | A1 | 7/2018 | Friedebach | |
| 2021/0060812 | A1 | 3/2021 | Kani et al. | |
| 2021/0121996 | A1 | 4/2021 | Hoff et al. | |
| 2022/0161455 | A1 | 5/2022 | Vandaalwyk et al. | |

FOREIGN PATENT DOCUMENTS

| | | | | |
|---|---|---|---|---|
| CN | 103042270 | A | 4/2013 | |
| CN | 204657627 | U | 9/2015 | |
| CN | 110259805 | A | 9/2019 | |
| CN | 213288900 | U | 5/2021 | |
| CN | 214417823 | U | 10/2021 | |
| DE | 19923642 | A1 | 11/2000 | |
| DE | 202006016266 | U1 | 3/2008 | |
| DE | 102007021334 | A1 | 11/2008 | |
| DE | 102008002159 | A1 | 12/2009 | |
| DE | 202018105381 | U | 10/2018 | |
| DE | 102018120656 | B3 * | 1/2020 | |
| EP | 2018936 | A1 | 1/2009 | |
| EP | 1375060 | B1 | 4/2012 | |
| EP | 2672042 | A2 * | 12/2013 | E05D 13/04 |
| FR | 3114764 | A1 | 4/2022 | |
| JP | 2014069348 | A | 4/2014 | |
| WO | 2012009741 | A1 | 1/2012 | |
| WO | 2022109381 | A1 | 5/2022 | |

OTHER PUBLICATIONS

DE-102018120656-B3 (Year: 2020).*

Search Report, GB Application No. 2207590.7, Aug. 8, 2023, 2 pages, IPO.

Search Report, GB Application No. 2209461.9, Aug. 8, 2023, 2 pages, IPO.

Extended European Search Report, EP Application No. 23171788.5, Oct. 6, 2023, 9 pages, EPO.

Amazon, "Evolution Power Tools ST2800 Circular Saw Guide Rail/Track," Sep. 27, 2018, 8 pages, Retrieved from the Internet on Nov. 8, 2023 at <amazon.co.uk/Evolution-Power-Tools-ST2800-Circular/dp/B07HRDG2JG/ref=asc_df_B07HRDG2JG?tag=bingshoppinga-21&linkCode=df0&hvlocint=&hvlo=undefined&th=1>.

Extended European Search Report, EP Application No. 23171790.1, mailed Nov. 20, 2023, 8 pages.

Extended European Search Report, EP Application No. 23171791.9, mailed Nov. 20, 2023, 8 pages.

Extended European Search Report, EP Application No. 23171792.7, mailed Nov. 20, 2023, 8 pages.

Extended European Search Report, EP Application No. 23171795.0, mailed Nov. 20, 2023, 7 pages.

Search Report, Application No. GB2209460.1, Aug. 7, 2023, 4 pages, IPO.

Search Report, GB Application No. 2209456.9, Aug. 4, 2023, 2 pages.

Search Report, GB Application No. 2209457.7, Aug. 3, 2023, 1 page.

Search Report, GB Application No. 2209459.3, Jul. 31, 2023, 1 page, GB IPO.

"A Smarter, Self-Aligning Guide Rail Connector for Festool, Makita & Triton", TSO Products; https://www.youtube.com/watch?v=aPGed2MTVI8, Apr. 19, 2021.

"Bosch FSN Professional Guide Rail Cutting System", 4HOME; youtube.com/watch?v=mr9Axorl_FA, Jun. 12, 2019, 1 page.

* cited by examiner

POWER TOOL GUIDE AND POWER TOOL GUIDE ASSEMBLY

CROSS-REFERENCE TO RELATED APPLICATIONS

This application claims priority to GB Patent Application No. 2207590.7, filed on May 24, 2022, and GB Patent Application No. 2209457.7, filed on Jun. 28, 2022, both of which are incorporated herein by reference in its entirety.

BACKGROUND

Field

The present disclosure relates to a power tool guide and power tool guide assembly. In particular, the present disclosure relates to circular saw guide and circular saw guide assembly.

Description of Related Art

On some construction sites it is necessary to cut large workpieces. Such large workpieces may be difficult to maneuver and the user may have to cut the workpieces in situ. A circular saw may be used to cut the workpiece e.g., a long wooden board. In order to achieve the cut, the user must move the circular saw along the workpiece. If the user attempts to cut the workpiece freehand, then the cut will not be straight.

In order to help the user make straight cuts in long workpieces, circular saws can be combined with a track or guide rail. One such known guided saw system is shown in US 2012/0079931.

A problem with this guided saw system is that the user may have difficulty moving the circular saw along the track. This is because sawdust or other construction site dirt may increase the friction between the track and the underside of the circular saw.

Some users need to make straight cuts in exceptionally long workpieces. It is impractical for a user to have a guided saw system with a very long track because the user cannot transport it easily to the work site. In this case it may be desirable to combine two tracks to create a single longer track for the saw.

Once such solution is shown in U.S. Pat. No. 9,156,184 whereby two guide rails are combined and held together with connectors. A problem is that the joint between the two guide rails may not be perfectly aligned. This means that the circular saw can catch on the joint between the two guide rails when sliding along the guide rail. This can affect the quality of the cut in the workpiece.

Another problem with U.S. Pat. No. 9,156,184 is that the ends of the guide rails can become damaged if the user impacts them against a wall. Since the guide rails are very long this can easily occur when moving the guide rails in the worksite. The damaged ends can further make the circular saw catch on the guide rail and make the power tool more difficult to slide along the guide rail.

SUMMARY

Examples of the present disclosure aim to address the aforementioned problems.

According to an aspect of the present disclosure there is a power tool guide comprising: an elongate body having a workpiece side configured to engage a workpiece and a power tool side configured to engage a power tool; at least one elongate rail mounted on the power tool side, the at least one elongate rail configured to engage a reciprocal channel in the power tool and limit lateral movement of the power tool in a direction perpendicular to a longitudinal axis of the elongate body; wherein the at least one elongate rail comprises a first width at a first position at a first longitudinal end of the elongate body and a second width at a second position remote from the first longitudinal end of the elongate body.

Optionally, the first width is smaller than the second width.

Optionally, the at least one elongate rail varies in width from the first position to the second position.

Optionally, the at least one elongate rail comprises chamfered walls between the first and second positions.

Optionally, the first width and the second width are smaller than a third width of the reciprocal channel.

Optionally, the at least one elongate rail comprises the first width at a third position at a second longitudinal end of the elongate body and the second width at a fourth position remote from the second longitudinal end of the elongate body.

Optionally, the power tool guide comprises an edge protector removably connectable to the first end of the elongate body.

Optionally, the edge protector comprises at least one rail profile portion configured to align with the at least one elongate rail.

Optionally, the at least one rail profile portion comprises a width equal to or less than the first width of the at least one elongate rail.

Optionally, at least one elongate sliding surface is mounted on the power tool side and remote from the at least one elongate rail.

Optionally, the at least one elongate sliding surface comprises a first elongate sliding surface and a second elongate sliding surface.

Optionally, the at least one elongate rail is between the first elongate sliding surface and the second elongate sliding surface.

Optionally, the first elongate sliding surface and the second elongate sliding surface are closer to a periphery of the elongate body than the at least one elongate rail.

Optionally, the at least one elongate rail is mounted along a centre axis of the elongate body.

In another aspect of the disclosure there is provided a power tool guide assembly comprising:

a power tool guide according the first aspect above; and a power tool mounted on the power tool guide.

BRIEF DESCRIPTION OF THE DRAWINGS

Various other aspects and further examples are also described in the following detailed description and in the attached claims with reference to the accompanying drawings, in which:

DETAILED DESCRIPTION

Figure 1:
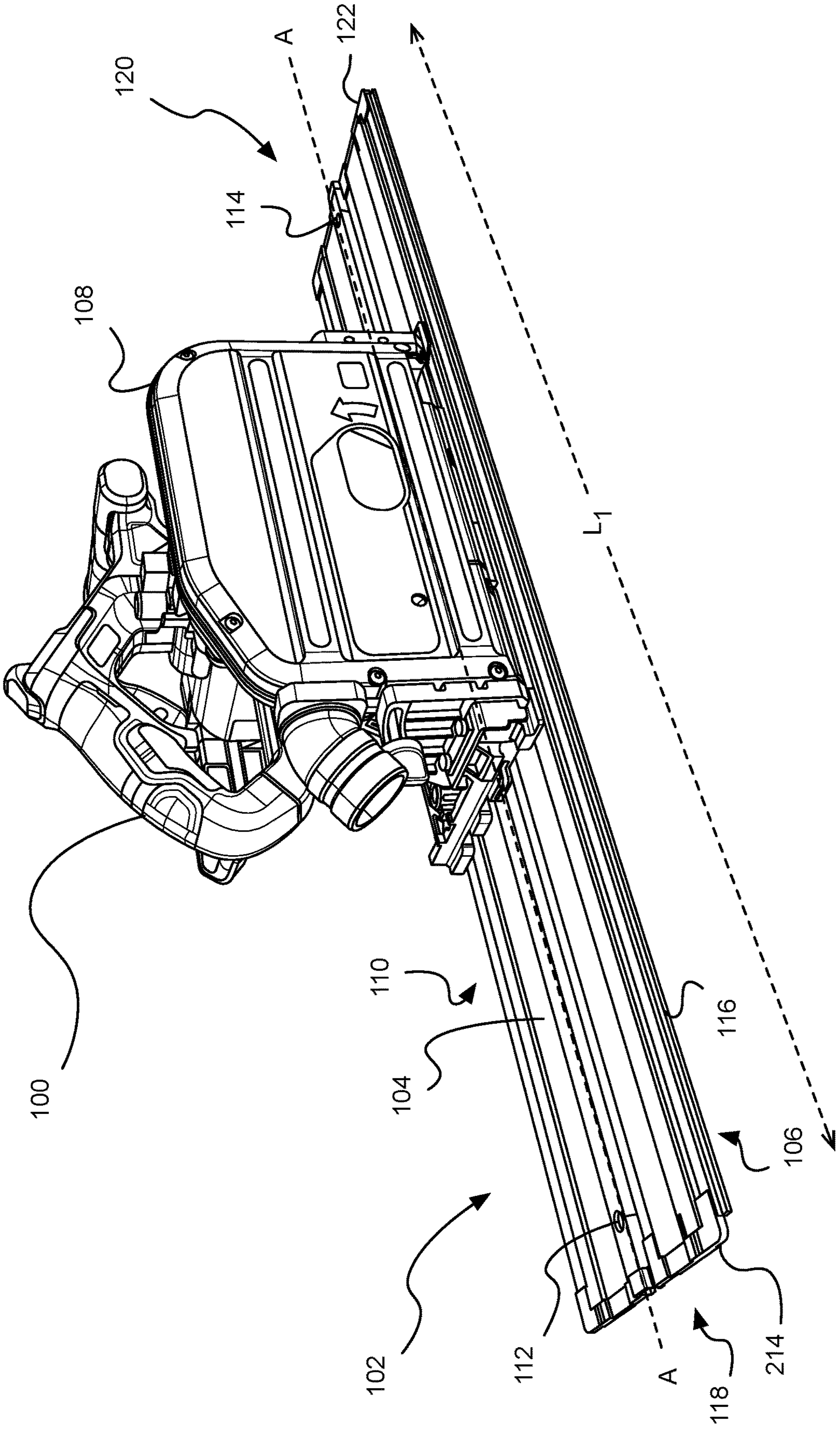
FIG. 1 shows a perspective view of a power tool guide and power tool according to an example embodiment.

FIG. 1 shows a perspective view of a power tool 100 mounted on a power tool guide 102. The power tool 100 as shown in FIG. 1 is a plunge type circular saw however, other types of saw or power tool can be mounted on the power tool guide 102. For example, circular saw, a router, a reciprocating saw, a jigsaw, an oscillating tool, or any other suitable power tool. Hereinafter the circular saw will be referred to as a power tool 100.

The combination of the power tool 100 such as a plunge type circular saw and the power tool guide 102 may also be referred to as a Tracksaw™ (Tracksaw™ is an unregistered trademark of Stanley Black & Decker, Inc).

The power tool 100 is slidably engageable with the power tool guide 102 when mounted on the power tool guide 102. The engagement between the power tool 100 and the power tool guide 102 will be discussed in further detail below.

The power tool guide 102 is configured to guide the power tool 100 along a predetermined path. This means that when the power tool guide 102 is engaged with a workpiece (not shown), the power tool 100 can be moved with respect to the power tool guide 102 to provide a controlled cut.

The power tool guide 102 comprises an elongate body 104 that extends along a longitudinal axis A-A. The longitudinal axis A-A is a central axis of the elongate body 104. The elongate body 104 as shown in FIG. 1 is straight and therefore the power tool guide 102 guides the power tool 100 to make a straight cut on the workpiece.

As shown in FIG. 1, the power tool 100 is mounted on the power tool guide 102 so that a portion of the power tool 100 projects over a first lateral side 106 of the elongate body 104. In some examples, the power tool 100 is a plunge type circular saw. This means that the cutting blade is retractable and plunges and moves into contact with the workpiece only when the user actuates the power tool 100. The cutting blade (not shown) is mounted within the blade housing 108. During actuation, the cutting blade is adjacent to the first lateral side 106 of the elongate body 104.

In some examples, the first lateral side 106 optionally comprises an anti-splinter strip 116. The anti-splinter strip 116 may be used when the workpiece is made from wood e.g., plywood. The anti-splinter strip 116 is a longitudinal element connected to the first lateral side 106 which engages the workpiece adjacent to the location of the cut in the workpiece. The anti-splinter strip 116 prevents the top surface of the workpiece from being torn by the cutting blade.

The elongate body 104 in some examples is symmetrical about the central longitudinal axis A-A. This means that the power tool 100 as shown in FIG. 1 can be rotated by 180 degrees and mounted such that the portion of the power tool 100 projects over a second lateral side 110 of the elongate body 104. The second lateral side 110 is identical to the first lateral side 106 and optionally also comprises the anti-splinter strip 116.

The elongate body 104 in some examples comprises at least one hanging hole 112. As shown in FIG. 1, the elongate body 104 comprises a first hanging hole 112 and a second hanging hole 114. This means that the power tool guide 102 can be hung on a wall horizontally or vertically to store the power tool guide 102 when not in use.

The power tool guide 102 as shown in FIG. 1 illustrates an example length $L_1$. The power tool guide 102 as shown in FIG. 1 is relatively short when compared to the size of the power tool 100. However, the power tool guide 102 can comprise any suitable length. Indeed, length $L_1$ in some examples can be 259.08 cm (102 inches), 149.86 cm (59 inches), 116.84 cm (46 inches). Alternatively, length $L_1$ can be 50 cm, 100 cm, 150 cm, 200 cm, 250 cm etc. As mentioned, the length $L_1$ of the power tool guide 102 can be any suitable length, however, a user may find that there is an upper limit to a practical length $L_1$ of the power tool guide 102. This is because the user may need to store the power tool guide 102 or transport the power tool guide 102 to the worksite. Accordingly, this is only possible if the power tool guide 102 can fit in a work vehicle or be handled easily by the user on the worksite.

The power tool guide 102 is connectable to another identical power tool guide (not shown). By connecting two power tool guides 102 together, the length of the predetermined path provided by the two power tool guides 102 for the power tool 100 can be increased. In some examples, two power tool guides 102 which are identical can be connected together. In some other examples two power tool guides 102 which have the same cross-sectional profile 300 (best shown in FIG. 3*a*) are connected together. This means that two power tool guides 102 which have the same the cross-sectional profile 300 but different lengths e.g., $L_1$, $L_{1'}$ can be combined. This means that the user can have increased flexibility combining power tool guides 102. Any number (e.g., 2, 3, 4 etc) of power tool guides 102 can be combined together to increase the length of the predetermined path for the power tool 100.

Connection of a plurality of power tool guides 102 will be discussed in more detail below.

Figure 2:
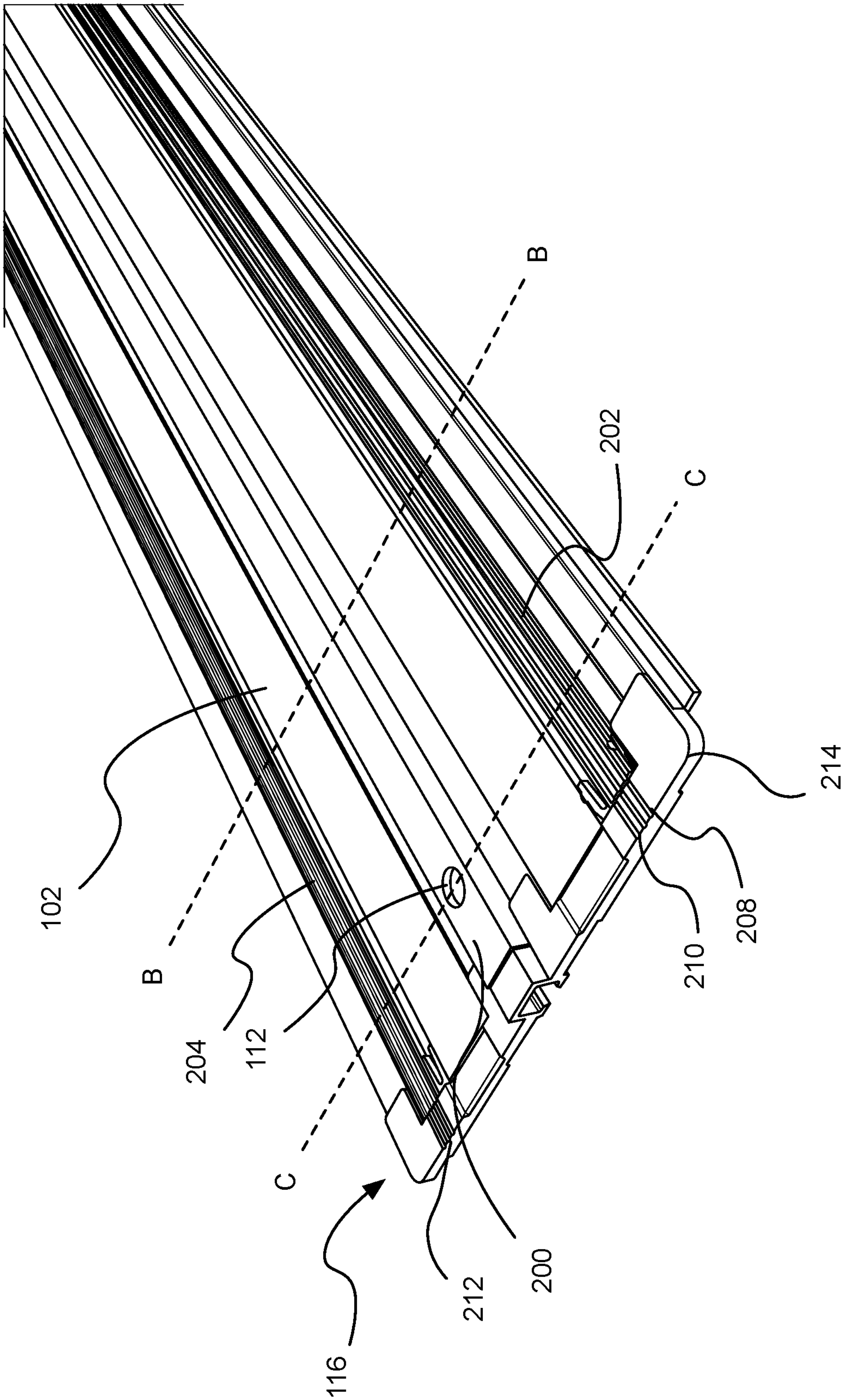
FIG. 2 shows a partial perspective view of a power tool guide according to an example embodiment.
Figure 3A:
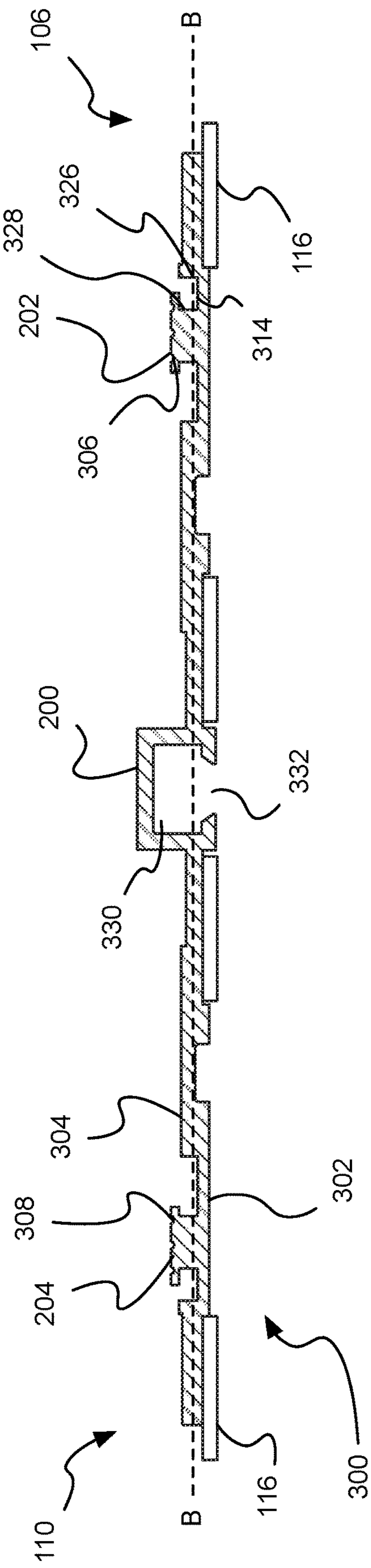
FIGS. 3*a* and 3*b* show a cross-sectional view of a power tool guide according to an example embodiment.
Figure 3B:
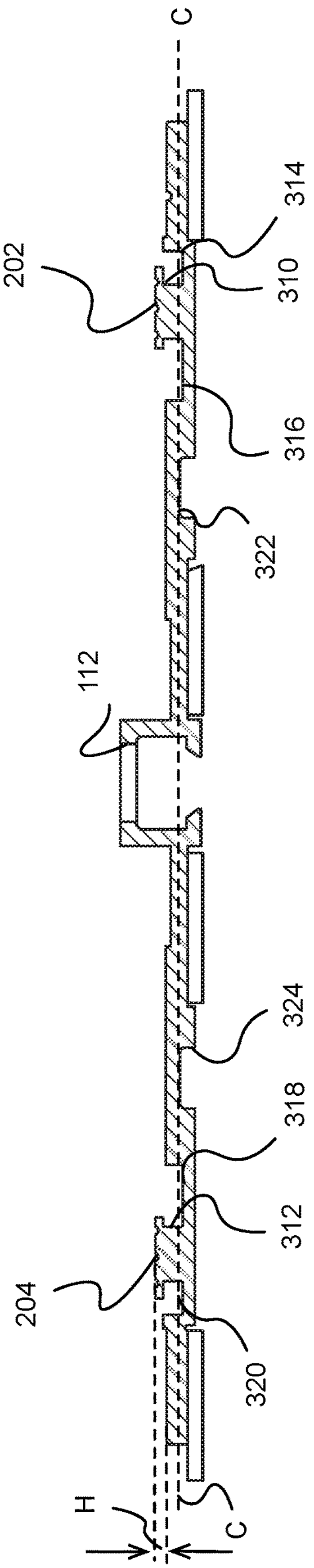

Turning to FIGS. 2, 3*a*, and 3*b*, the power tool guide 102 will be discussed in more detail. FIG. 2 shows a perspective view of part of the power tool guide 102. FIGS. 3*a* and 3*b* show a cross-sectional view of the power tool guide 102 across the axes B-B and C-C respectively in FIG. 2. Axis C-C extends across the elongate body 104 in a direction perpendicular to the longitudinal axis A-A through the first hanging hole 112. Axis B-B extends across the elongate body 104 in a direction perpendicular to the longitudinal axis A-A.

The elongate body 104 comprises a generally planar structure and the elongate body 104 extends in a plane defined by axis A-A and B-B, or A-A and C-C.

As shown in FIG. 3*a*, the elongate body 104 comprises a workpiece side 302 configured to engage a workpiece (not shown). In this way the workpiece side 302 of the power tool guide 102 faces the workpiece during use. The workpiece side 302 can be rested on the top surface of the workpiece. The user may place their hand on the power tool guide 102 to ensure it remains fixed with respect to the workpiece. Alternatively, the power tool guide 102 can be clamped to the workpiece. Additionally, or alternatively, the elongate body 104 can optionally comprise one or more holes (not shown) for temporarily fastening the power tool guide 102 to the workpiece with e.g. screws.

The elongate body 104 comprises a power tool side 304 configured to engage the power tool 100. The power tool side 304 of the power tool guide 102 faces the power tool 100 during use. The workpiece side 302 and the power tool side 304 are on opposite sides of the elongate body 104.

Engagement of the power tool 100 with the power tool guide 102 will now be discussed. The elongate body 104 comprises an elongate rail 200 extending along the elongate body 104. The elongate rail 200 extends along an axis which is parallel with the longitudinal axis A-A. As shown in FIGS. 1, 2, 3*a* and 3*b* the elongate rail 200 is coaxial with the central longitudinal axis A-A.

Figure 11:
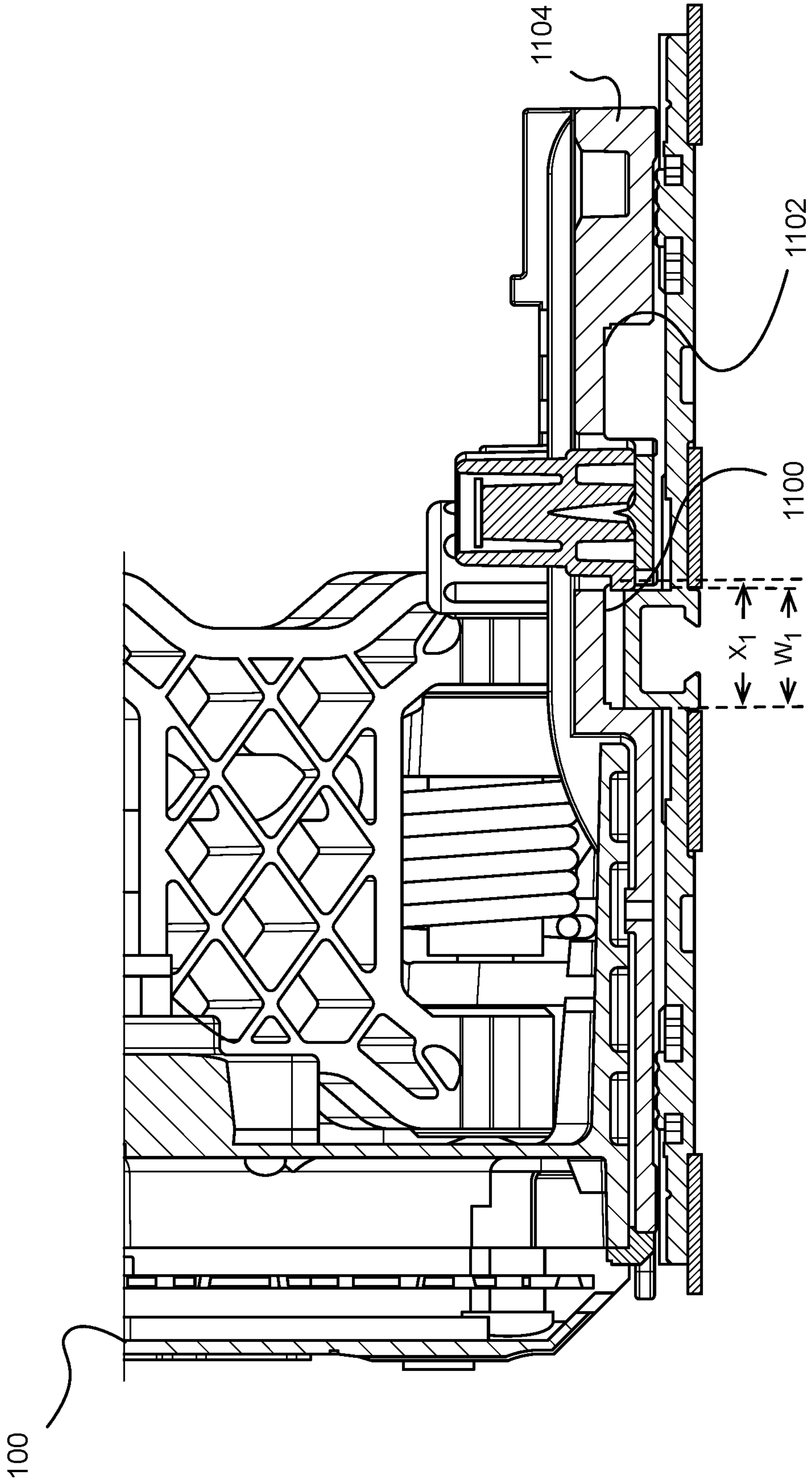
FIGS. 11 and 12 shows a cross-sectional view of a power tool when mounted on a power tool guide according to an example embodiment.

The elongate rail 200 is configured to engage a reciprocal channel 1100 in the power tool 100. The reciprocal channel 1100 is best shown in FIG. 11 which shows a cross-sectional view of the power tool 100 when mounted on the power tool guide 102. As shown in FIG. 11, the power tool 100 may optionally comprise a plurality of reciprocal channels 1100, 1102 in a base 1104 of the power tool 100. In the example in FIG. 11 the power tool 100 comprises a first reciprocal channel 1100 and a second reciprocal channel 1102. Each of the first reciprocal channel 1100 and the second reciprocal channel 1102 are configured to receive the elongate rail 200. This means that the power tool 100 can be slidably engaged at different cutting blade positions with respect to the power tool guide 102. In some further examples (not shown), there can be any number of reciprocal channels 1100, 1102 in the base 1104 of the power tool 100.

The width $w_1$ of the elongate rail 200 is a first rail width $w_1$. The width $x_1$ of the first reciprocal channel 1100 and the second reciprocal channel 1102 is a first power tool channel width $x_1$. The first rail width $w_1$ is smaller than the first power tool channel width $x_1$. The first rail width $w_1$ is sufficiently smaller than the first power tool channel width $x_1$ that the first or second reciprocal channels 1100, 1102 can freely slide along the elongate rail 200. At the same time, the first rail width $w_1$ of the elongate rail 200 prevents or limits lateral movement of the power tool 100 in a direction perpendicular to a longitudinal axis A-A of the elongate body 104 e.g., in a direction parallel with the transverse axis B-B.

While FIGS. 1, 2, 3*a* and 3*b* only show one elongate rail 200, in some other examples, there can optionally be a plurality of elongate rails 200 on the power tool guide 102. The plurality of elongate rails 200 provide plurality of different predetermined paths along which the power tool 100 can slide. This means that the power tool 100 can be slidably engaged at different cutting blade positions with respect to the power tool guide 102. Furthermore, the plurality of elongate rails 200 can be combined with a plurality of reciprocal channels 1100, 1102 in the power tool 100. This can increase the number of operable positions for the power tool 100 to slide along when mounted to the power tool guide 102.

The elongate rail 200 projects upwardly from the power tool side 304 of the elongate body 104 in a direction perpendicular to the transverse axis B-B and the longitudinal axis A-A. This means that the elongate rail 200 can project into and engage the reciprocal channel 1100 of the power tool 100. This makes mounting the power tool 100 on the power tool guide 102 simple for the user.

A problem with known guided saw systems is that the user may have difficulty moving the circular saw along the track.

This is because sawdust or other construction site dirt may increase the friction between the track and the underside of the circular saw.

In order to reduce the friction between the power tool 100 and the power tool guide 102, the power tool guide 102 comprises at least one elongate sliding surface 202. As shown in FIG. 2 there is a first elongate sliding surface 202 and a second elongate sliding surface 204. The first elongate sliding surface 202 and the second elongate sliding surface 204 extend along the elongate body 104. The first elongate sliding surface 202 and the second elongate sliding surface 204 extend on the power tool side 304 of the elongate body 104. In this way, the first elongate sliding surface 202 and the second elongate sliding surface 204 face the base 1104 of the power tool 100 when the power tool 100 is mounted on the power tool guide 102.

The first elongate sliding surface 202 and the second elongate sliding surface 204 extend along an axis which is parallel with the longitudinal axis A-A. As shown in FIG. 3*a*, the first elongate sliding surface 202 and the second elongate sliding surface 204 are remote from the elongate rail 200. The first elongate sliding surface 202 is closer to the first lateral side 106 than the elongate rail 200. Similarly, the second elongate sliding surface 204 is closer to the second lateral side 110 than the elongate rail 200.

This means that the first elongate sliding surface 202 and the second elongate sliding surface 204 are spaced apart and provide stable engagement with the power tool 100. Since the first elongate sliding surface 202 and the second elongate sliding surface 204 are closer to the first and second lateral sides 106, 110 of the elongate body 104, the power tool 100 does not rotate about the first elongate sliding surface 202 or the second elongate sliding surface 204 when the user pushes down or slides the power tool 100. This means the power tool base 1104 remains engaged with the first elongate sliding surface 202 and the second elongate sliding surface 204 when mounted on the power tool guide 102. The elongate rail 200 protruding into the reciprocal channel 1100 may also prevent rotation of the power tool 100 about the power tool guide 102.

While the Figures show the first elongate sliding surface 202 and the second elongate sliding surface 204 on the elongate body 104, there can be any number of elongate sliding surfaces on the elongate body 104. For example, in a less preferred example there can be a single elongate sliding surface (not shown). This may be less desirable because the power tool 100 may rock with respect to the power tool guide 102 if the user exerts a turning moment on the power tool 100. However, a single elongate sliding surface will still reduce the friction between the power tool guide 102 and the power tool 100.

In other examples, there may be more than two elongate sliding surfaces 202, 204 on the elongate body 104. Providing more elongate sliding surfaces 202, 204 may also be less preferable because an increased number of elongate sliding surfaces 202, 204 may increase the friction between the power tool 100 and the power tool guide 102.

Turning back to FIGS. 2 and 3*a*, the first and second elongate sliding surfaces 202, 204 comprises at least one longitudinal groove 306, 308. As shown in FIG. 3*a*, the first elongate sliding surface 202 comprises a first longitudinal groove 306 and the second elongate sliding surface 204 comprises a second longitudinal groove 308.

Each of the first and second elongate sliding surfaces 202, 204 comprise a plurality of longitudinal grooves 306, 308. For the purpose of clarity only one longitudinal groove 306, 308 has been labelled in FIG. 3*a* on the first and second elongate sliding surfaces 202, 204. In FIG. 3*b*, there are three longitudinal grooves 306, 308 on both the first and second elongate sliding surfaces 202, 204. However, in other examples, there can be any number of longitudinal grooves 306, 308 e.g., 2, 3, 4, 5, 6, 7, 8, 9, 10 grooves on each of the first and second elongate sliding surfaces 202, 204.

In some examples, the first and second longitudinal grooves 306, 308 are continuous along the first and second elongate sliding surfaces 202, 204. In other examples, the first and second elongate sliding surfaces 202, 204 can comprise a series of intermittent longitudinal grooves 306, 308 (not shown). However, an intermittent longitudinal groove pattern may be less preferable since this may increase the friction between the power tool 100 and the power tool guide 102.

By providing a plurality of longitudinal grooves 306, 308 on the first and second elongate sliding surfaces 202, 204, the surface area of contact between the power tool 100 and the power tool guide 102 is reduced. This reduces the friction between the power tool guide 102 and the power tool 100. This also reduces the amount of debris or dirt than can be disposed between the first and second elongate sliding surfaces 202, 204 and the base 1104 of the power tool 100.

As mentioned above, the elongate body 104 extends in a plane comprising the longitudinal axis A-A and the transverse axis B-B. The first and second elongate sliding surfaces 202, 204 extends in a plane parallel to the plane of the elongate body 104. This means the power tool 100 slides in a plane parallel to the plane of the power tool guide 102.

FIGS. 3*a* and 3*b* show that the first and second elongate sliding surfaces 202, 204 project above the power tool side 304 of the elongate body 104. The first and second elongate sliding surfaces 202, 204 are raised above the power tool side 304 by a height H. In some examples, the height H is 2.1 mm above the power tool side 304. In other examples the height is 0.5 mm, 1 mm, 1.5 mm, 2 mm, 2.5 mm, 3 mm, 4 mm, 5 mm or any other suitable height.

In this way, the first and second elongate sliding surfaces 202, 204 are configured to position the power tool 100 at a predetermined height H above the power tool side 304 of the elongate body 104 when the power tool 100 is in sliding engagement with the first and second elongate sliding surfaces 202. 204. Since the base 1104 of the power tool 100 is raised by the height H above the power tool side 304, small amounts dirt and grit can rest on the power tool side 304 without interfering with the sliding of the power tool 100 on the power tool guide 102.

In some examples, only the first and second elongate sliding surfaces 202, 204 are configured to transmit a force in a direction from the power tool 100 to the workpiece when the power tool 100 is in sliding engagement with the first and second elongate sliding surface 202, 204. This means that only the first and second elongate sliding surfaces 202, 204 receive the weight of the power tool 100 and/or the force exerted by the user on the power tool 100 towards the power tool guide 102 and the workpiece. The vertical walls of the elongate rail 200 may engage the walls of the reciprocal channel 1100, but elongate rail 200 does not receive the weight of the power tool 100. Indeed, the height of the elongate rail 200 is smaller than the depth of the reciprocal channel 1100. This can be seen in FIG. 11.

The first elongate sliding surface 202 is mounted on a first projecting rib portion 310 connected to the power tool side 304 of the elongate body 104. Similarly, the second elongate sliding surface 204 is mounted on a second projecting rib portion 312 connected to the power tool side 304 of the elongate body 104.

The first and second elongate sliding surfaces 202, 204 overhang the first and second projecting rib portions 310, 312.

Optionally, the elongate body 104 comprises one or more connector channels 314, 316, 318, 320. The connector channels 314, 316, 318, 320 are configured to receive one or more connectors of an edge protector 214. The edge protector 214 will be discussed in more detail below in reference to FIGS. 5, 6, 7, and 8.

However, the connector channels 314, 316, 318, 320 extend along the elongate body 104 in a direction parallel to the longitudinal axis A-A. The connector channels 314, 316, 318, 320 can also provide a secondary function of catching sawdust and other debris underneath the first and second elongate sliding surfaces 202, 204 rather than being trapped between the first and second elongate sliding surface 202, 204 and the base 1104 of the power tool 100. This means that first and second elongate sliding surfaces 202, 204 are more likely to remain debris free.

The elongate body 104 in some examples is extruded aluminium. In some other examples, the elongate bode is made from steel, stainless steel or any other suitable material. By extruding the elongate body 104, it is possible to provide the elongate body 104 with integral first and second elongate sliding surfaces 202, 204. This means that additional strips of material do not have to be adhered to the elongate body 104 to reduce the friction between the elongate body 104 and the power tool base 1104. This advantageously makes manufacture of the power tool guide 102 simpler.

As mentioned above, the power tool guide 102 optionally comprises an edge protector 214. As shown in FIG. 2, the edge protector 214 is removably mountable to a first longitudinal end 118 of the elongate body 104. Optionally, the edge protector 214 comprises at least one edge protector groove 208 configured to align with the at least one longitudinal groove 306, 308 on the first and second elongate sliding surfaces 202, 204 when mounted to the first longitudinal end 118 of the elongate body 104. Only one edge protector groove 208 is labelled in FIG. 2 for the purposes of clarity. However, in some examples there are the same number (e.g., three) of edge protector grooves 208 as there are longitudinal grooves 306, 308 on the first and second elongate sliding surfaces 202, 204. In this way, the edge protector 214 can also comprise a first edge protector sliding surface 210 and a second edge protector sliding surface 212 aligned with the first and second elongate sliding surfaces 202, 204.

A problem with known guided saw system with multiple tracks is that the user may have difficulty moving the circular saw along the track. This may be particularly problematic at the joint between two tracks. This is because the end of the track may be damaged or alternatively, one track may be slightly offset from the other track. This means that the power tool 100 can snag at the joint which can affect the cut.

Figure 4:
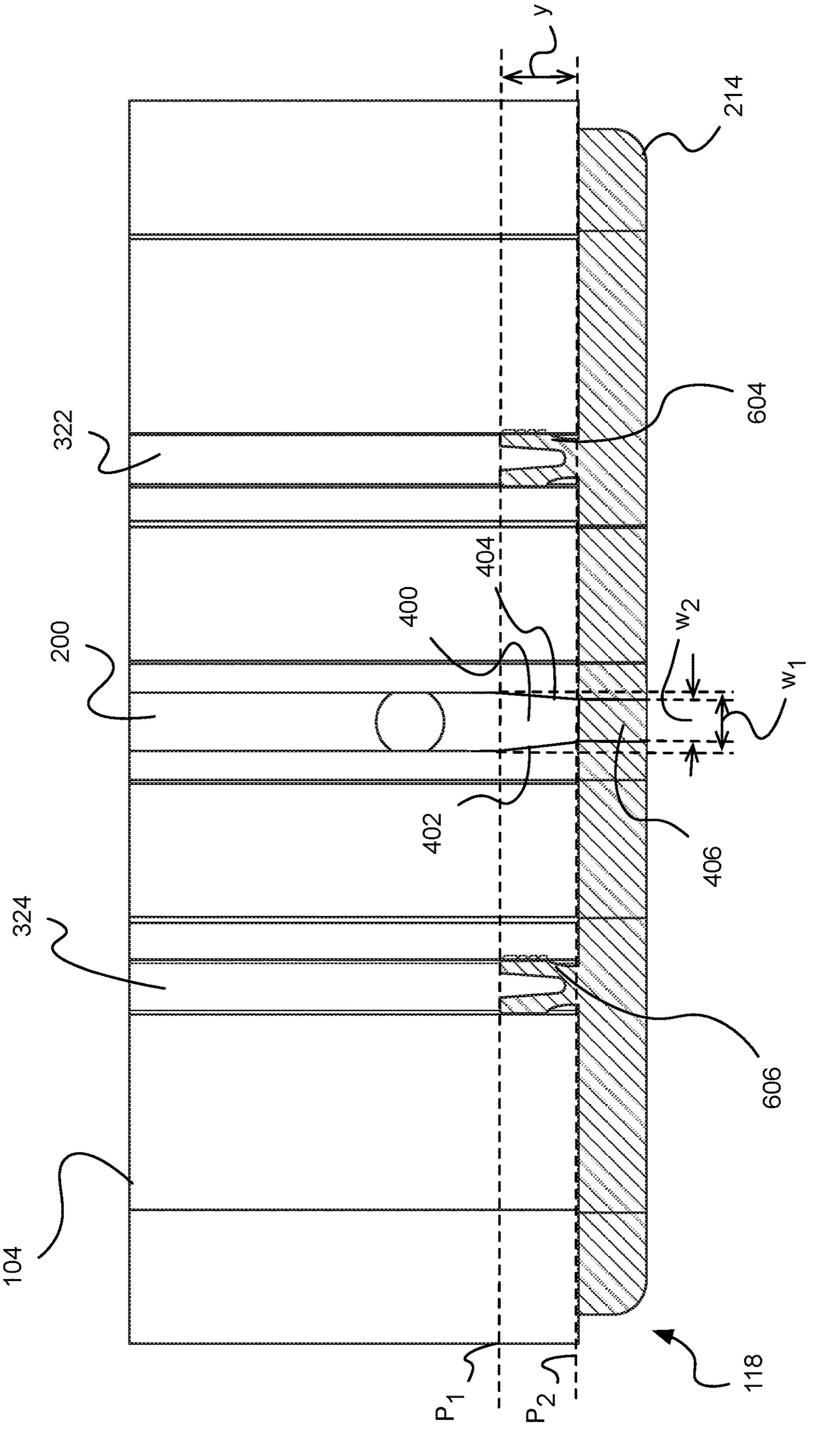
FIG. 4 shows a partial underneath plan view of a power tool guide according to an example embodiment.
Figure 5:
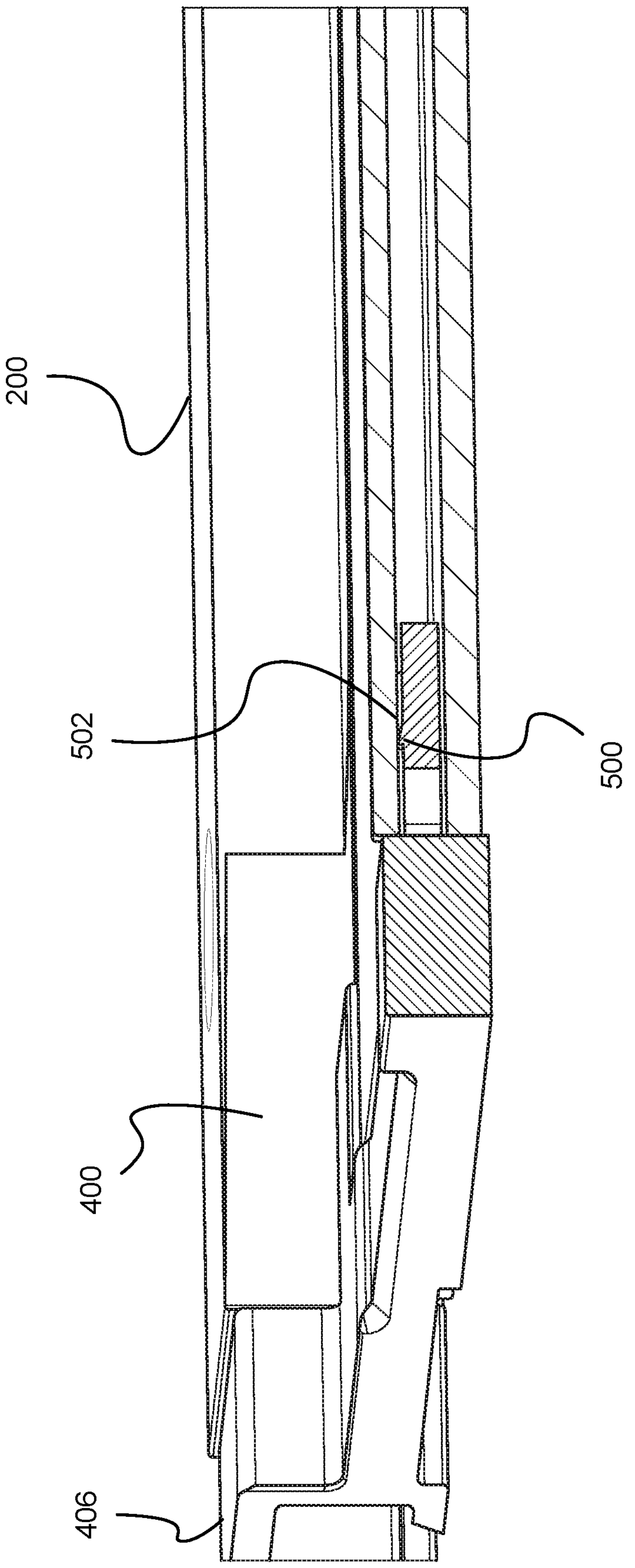
FIG. 5 shows a close-up perspective cut-away view of a power tool guide according to an example embodiment.

The power tool guide 102 will now be discussed in reference to FIGS. 4 and 5. FIG. 4 shows a partial underneath plan view of the power tool guide 102 at the first longitudinal end 118 of the elongate body 104. FIG. 5 shows a close-up perspective cut-away view of the power tool guide 102 at the first longitudinal end 118 of the elongate body 104.

In some examples, the elongate rail 200 of the power tool guide 102 optionally comprises a varying width. The elongate rail 200 comprising the varying width can optionally be combined with the first and second elongate sliding surfaces 202, 204 discussed in reference to FIGS. 1, 2, 3*a* and 3*b*.

However, in some examples the elongate rail 200 comprising the varying width does is not combined with the first and second elongate sliding surfaces 202, 204.

The elongate rail 200 comprises a first rail width $w_1$ at a first position $P_1$ at the first longitudinal end 118 of the elongate body 104. The elongate rail 200 comprises a second rail width $w_2$ at a second position $P_2$ along the longitudinal axis of the elongate body 104. The first position $P_1$ is at the first longitudinal end 118 of the elongate body 104 or proximal to the first longitudinal end 118. The second position $P_2$ is a position remote the first longitudinal end 118 along the longitudinal axis A-A.

The first rail width $w_1$ is the same as shown in FIG. 11. As shown in FIG. 4, the second rail width $w_2$ is smaller than the first rail width $w_1$. Furthermore, the second rail width $w_2$ is also smaller than the first power tool channel width $x_1$ of the reciprocal channel 1100 as shown in FIG. 11. This means that the elongate rail 200 is narrower at the first and second longitudinal ends 118, 120 of the elongate body 104. This means that when the power tool guide 102 is connected to another power tool guide 102 and the two power tool guides 102 are slightly offset, the power tool 100 can still freely slide along the elongate rail 200. This is because even when there is an offset between the two power tool guides 102 connected together, the offset and the second rail width $w_2$ is likely to be smaller than the first rail width $w_1$.

In some examples, the elongate rail 200 comprises a tapered section 400 wherein the width of the elongate rail 200 gradually reduces from the first rail width $w_1$ and the first position $P_1$ to the second width $w_2$ and at the second position $P_2$. As shown in FIG. 4, the tapered section 400 comprises a length y in the direction along the longitudinal axis A-A. The length y of the tapered section 400 is much smaller than the total length of the elongate body 104.

In some examples the walls 402, 404 of the elongate rail 200 are chamfered between the first position $P_1$ and at the second position $P_2$. Accordingly, the chamfered walls 402, 404 in the tapered section 400 are straight between the first position $P_1$ and at the second position $P_2$. Alternatively, the walls 402, 404 in the tapered section 400 comprises a curved profile (not shown) between the first position $P_1$ and at the second position $P_2$.

Since the second rail width $w_2$ is only at the first longitudinal end 118 of the elongate rail 200, only a small proportion of the elongate rail 200 comprises the smaller second rail width $w_2$. The length y of the tapered section 400 is also much smaller than the length of the reciprocal channel 1100 of the power tool 100 extending along a longitudinal axis of the reciprocal channel 110. This means that when the power tool 100 is mounted on the elongate rail 200, the reciprocal channel 1100 will always be in contact with sections of the elongate rail 200 which have the larger first rail width $w_1$. This means that varying the width of the elongate rail 200 will not affect the position of the power tool 100 with respect to the power tool guide 102. In other words, the reciprocal channel 1100 is still limited in its lateral movement in a direction perpendicular to a longitudinal axis A-A of the elongate body 104 even when the reciprocal channel 1100 is engaged with a section of the elongate rail 200 which comprises the second rail width $w_2$.

As shown in FIG. 1, the power tool guide 102 also comprises a second longitudinal end 120. In some examples, the second longitudinal end 120 may also comprise a similar configuration as shown in FIG. 4. That is, the elongate rail 200 comprises the second width $w_2$ at both the first and second longitudinal ends 118, 120.

As mentioned above in some examples, the power tool guide 102 comprises an edge protector 214 which is removably connectable to the first longitudinal end 118 of the elongate body 104. The edge protector 214 comprises a profile similar to the elongate body 104. Accordingly, the edge protector 214 comprises at least one rail profile portion 406. The rail profile portion 406 is configured to align with the elongate rail 200. In some examples, the rail profile portion 406 comprises a width equal to or less that the first rail width $w_1$ of the elongate rail 200. As shown in FIG. 2, the rail profile portion 406 comprises a width equal to the second rail width $w_2$ of the elongate rail 200. This means that the edge protector 214 also does not impeded the movement of the power tool 100 when it is slidably engaging with the elongate rail 200. The edge protector 214 also does not cause snagging at the joints between the two power tool guides 102.

Figure 6:
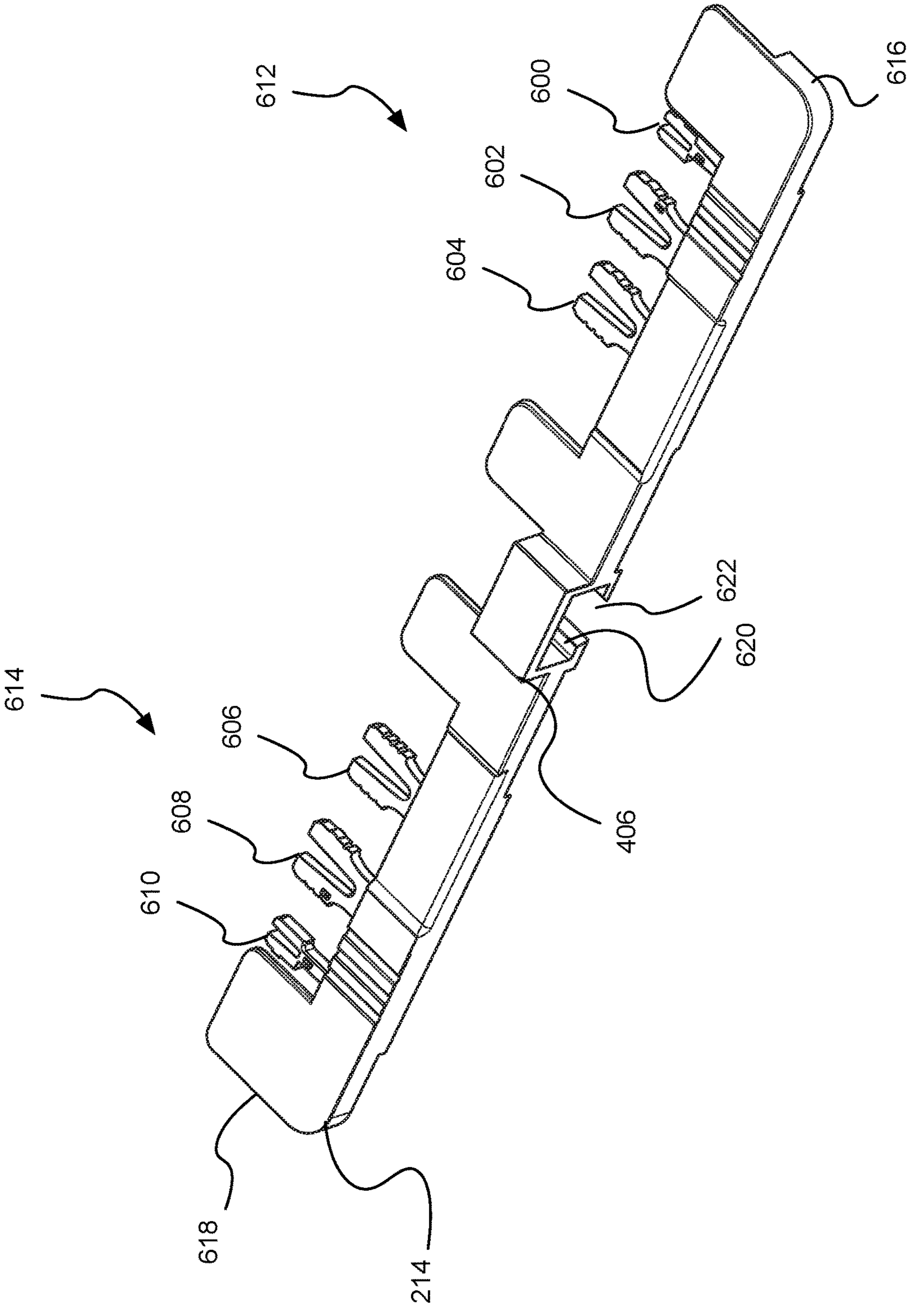
FIG. 6 shows a perspective view of an edge protector connectable to a power tool guide according to an example embodiment.
Figure 7:
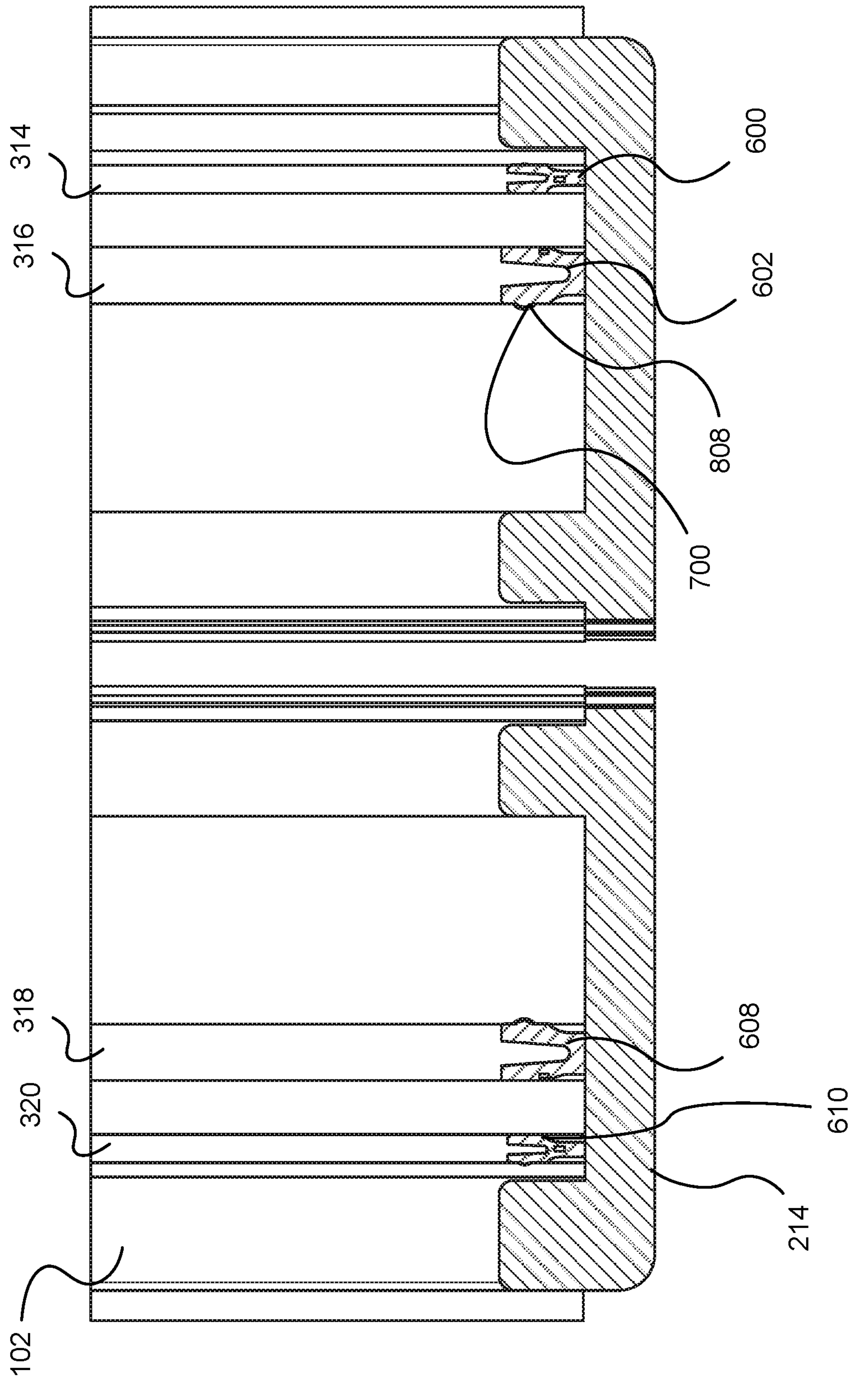
FIG. 7 shows a close-up underneath plan view of a power tool guide according to an example embodiment.
Figure 8:
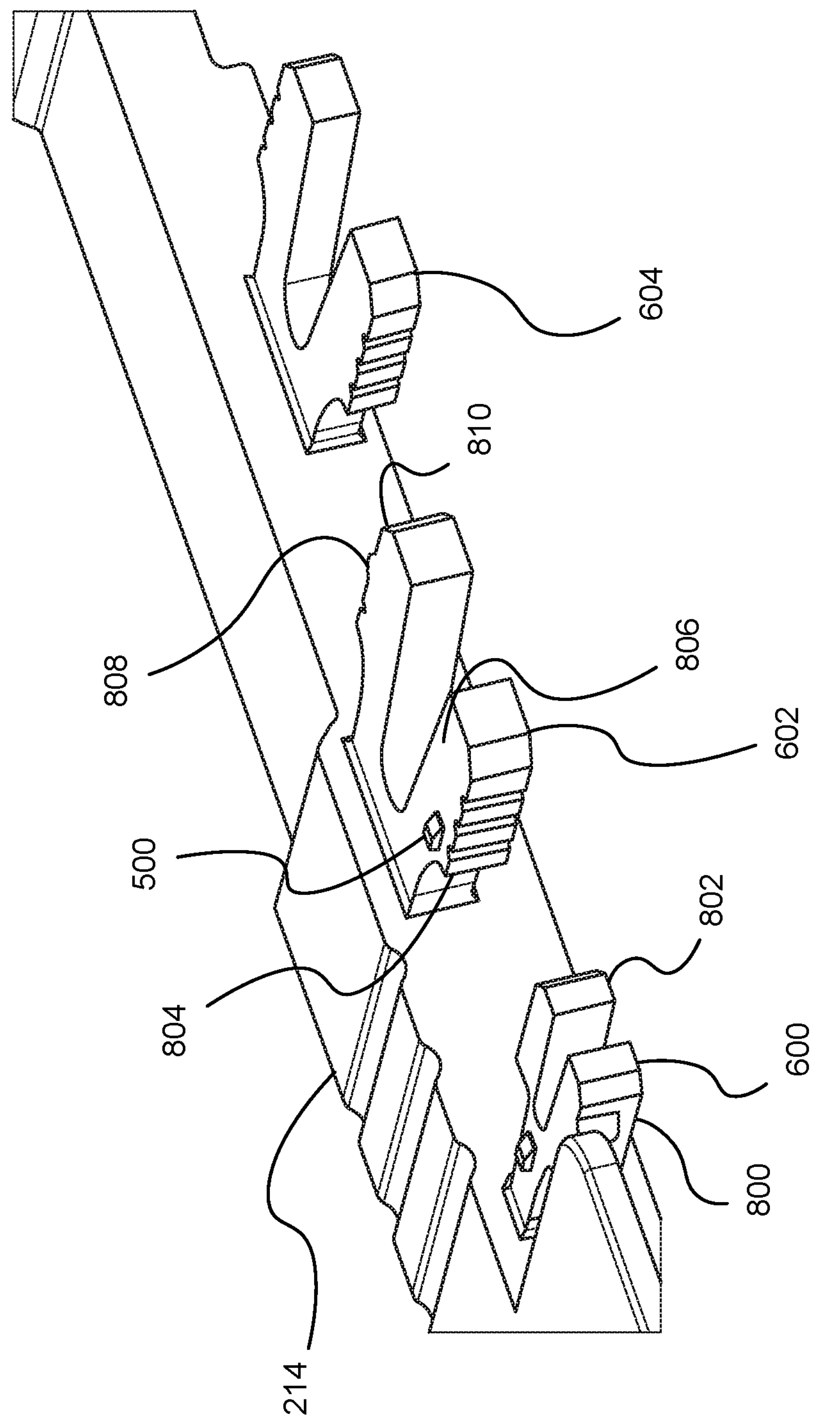
FIG. 8 shows a close-up perspective view of an edge protector connectable to a power tool guide.

The edge protector 214 will now be described in more detail with respect to FIGS. 6, 7 and 8. FIG. 6 shows a perspective view of the edge protector 214. FIG. 7 shows a close-up underneath plan view of the power tool guide 102. FIG. 8 shows a close-up perspective view of the edge protector 214.

The edge protector 214 is configured to connect to the first longitudinal end 118. By mounting the edge protector 214 on the first longitudinal end 118, the edge protector 214 prevents the first longitudinal end 118 of the elongate body 104 from becoming damaged. Since the elongate body 104 can be long and difficult to handle by the user in a confined space, it is likely that the first longitudinal end 118 will impact against walls, floors etc. Such impacts can deform the elongate body 104 and e.g., the elongate rail 200 which can cause the power tool 100 not to slide easily along the elongate rail 200.

In some examples, a first edge protector 214 is mounted at the first longitudinal end 118 and a second edge protector 122 is mounted at the second longitudinal end 120. FIG. 1 shows the first and second edge protectors 214, 122 mounted respectively to the first longitudinal end 118 and the second longitudinal end 120. The first and second edge protectors 214, 122 are the same. Hereinafter, only the first edge protector 214 will be discussed, although the same will apply to the second edge protector 122.

As mentioned above, the edge protector 214 is removable from the elongate body 104. This means that the edge protector 214 can be removed and replaced if the edge protector 214 becomes worn or damaged.

In some examples the edge protector 214 is made from a thermoplastic material, a rubber material, or a silicone material. In some examples, the edge protector 214 is made from acrylonitrile butadiene styrene (ABS), high-density polyethylene (HDPE), polycarbonate (PC), polyamide-imide (PAI), high impact polystyrene (HIPS), polybutylene terephthalate (PBT) or a combination thereof e.g., polycarbonate (PC) and polybutylene terephthalate (PBT) or any other suitable hard wearing impact resistance material.

Figure 12:
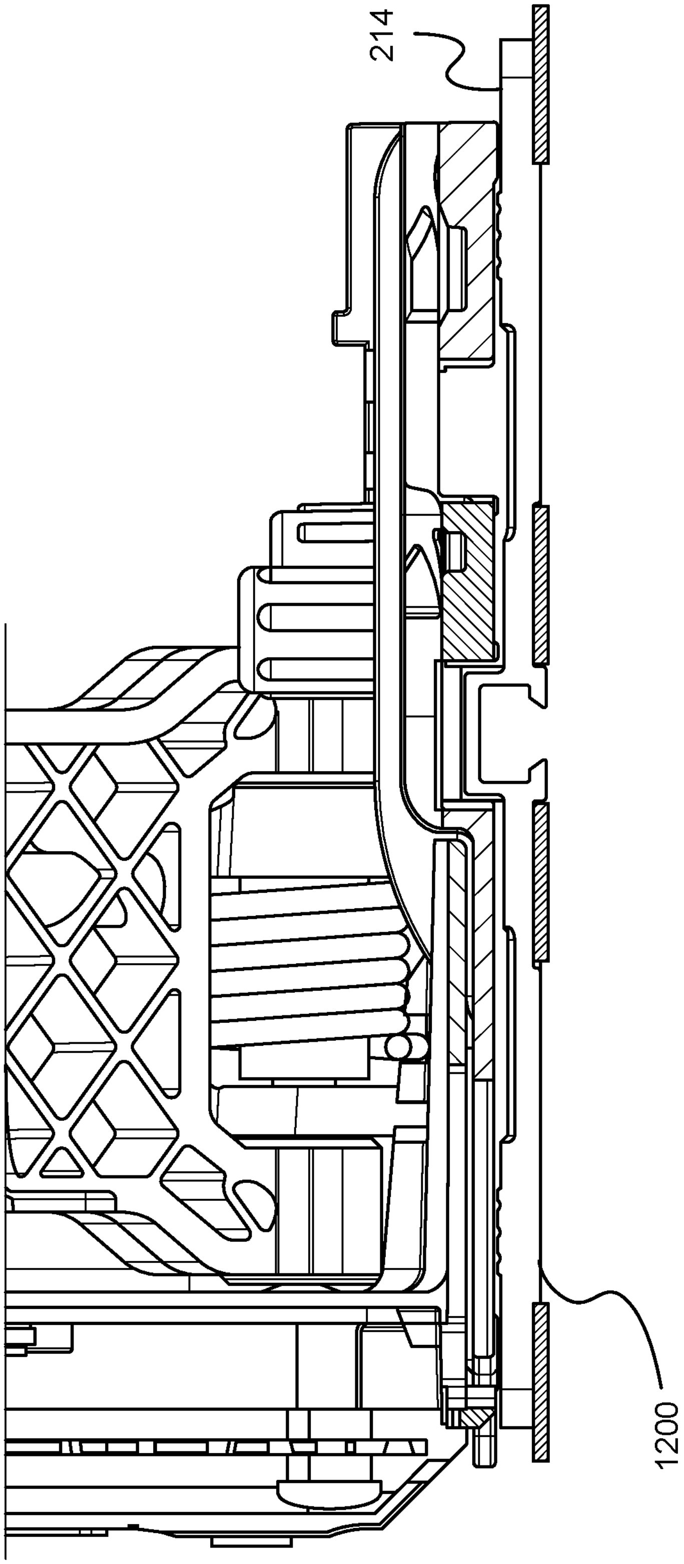

In some examples, a cross-sectional profile 1200 (best shown in FIG. 12) of the edge protector 214 is the same as the cross-sectional profile 300 of the power tool guide 102. In other examples, the cross-sectional profile 1200 of the edge protector 214 is smaller than the cross-sectional profile 300 of the power tool guide 102. FIG. 12 is the same as FIG. 11 except that FIG. 12 which shows a cross-sectional view of the power tool 100 when mounted on the power tool guide 102 over the edge protector 214.

Turning back to FIG. 6, the edge protector 214 will be discussed further. In some examples, the edge protector 214 optionally comprises at least one rail profile portion 406 configured to align with the at least one elongate rail 200.

The edge protector 214 is securely mounted to the elongate body 104. In some examples, the edge protector 214 is removeable by the user if the edge protector 214 is damaged. In some other examples, the edge protector 214 is glued or overmolded in place. Alternatively, the connectors 600, 602, 604, 606, 608, 610 shown in FIG. 6 provide sufficient friction between the elongate body 104 and the edge protector 214 that the edge protector 214 cannot be removed by the user. This means that alternatively, the user cannot remove and replace the edge protector 214. This may be preferable if the edge protector 214 is to be more securely fixed to the elongate body 104. The examples as shown in reference to the Figures disclose a removeable edge protector 214.

Connection of the removeable edge protector 214 to the elongate body 104 will now be discussed. In some examples, the edge protector 214 comprises at least one connector 600 configured to engage a reciprocal connector channel 314 in the elongate body 104. FIG. 6 shows a plurality of connectors 600, 602, 604, 606, 608, 610 to securely fasten the edge protector 214 to the elongate body 104. Each of the plurality of connectors 600, 602, 604, 606, 608, 610 is configured to engage the elongate body 104 in reciprocal recess e.g., connector channels 314, 316, 318, 320, 322, 324 (best shown in FIG. 3*b*).

In some examples, the edge protector 214 comprises any number of connectors 600 configured to engage a reciprocal connector channel 314.

As mentioned above, each of the reciprocal connector channels 314, 316, 318, 320, 322, 324 are an open channel formed in the elongate body 104. In some other examples the connector channels 314, 316, 318, 320, 322, 324 may be a closed channel (not shown) bored into the elongate body 104. Optionally, the plurality of connectors 600, 602, 604, 606, 608, 610 may be partially visible when mounted in the connector channels 314, 316, 318, 320, 322, 324.

The edge protector 214 as shown in FIG. 6 comprises a first lateral side group 612 of connectors 600, 602, 604. The first lateral side group 612 of connectors comprises a first connector 600, a second connector 602 and a third connector 604. The first, second and third connectors 600, 602, 604 are mounted on the first lateral edge protector side 616 of the edge protector 214. The first lateral edge protector side 616 is on the same side as the first lateral side 106 of the elongate body 104.

The first connector 600, the second connector 602 and the third connector 604 are respectively configured to engage with a reciprocal first connection channel 314, second connection channel 316, and third connection channel 322. Similarly, the first connection channel 314, the second connection channel 316, and the third connection channel 322 are located on the first lateral side 106 of the elongate body 104.

The edge protector 214 as shown in FIG. 6 also comprises a second lateral side group 614 of connectors 606, 608, 610. The second lateral side group 614 of connectors comprises a fourth connector 606, a fifth connector 608 and a sixth connector 610. The fourth, fifth and sixth connectors 606, 608, 610 are mounted on the second lateral edge protector side 618 of the edge protector 214. The second lateral edge protector side 618 is on the same side as the second lateral side 110 of the elongate body 104.

The fourth connector 606, the fifth connector 608 and the sixth connector 610 are respectively configured to engage with a reciprocal fourth connection channel 324, fifth connection channel 318, and sixth connection channel 320. Similarly, the fourth connection channel 324, the fifth connection channel 318, and the sixth connection channel 320 are located on the second lateral side 110 of the elongate body 104.

The first lateral side group 612 and the second lateral side group 614 are mounted either side of the rail profile portion 406.

As mentioned above, the first connection channel 314 and the second connection channel 316 are separated by the first elongate sliding surface 202 and the first projecting rib portion 310. Likewise, the fifth connection channel 318 and the sixth connection channel 320 are separated by the second elongate sliding surface 204 and the second projecting rib portion 312.

In some examples, the third connector 604 and the fourth connector 606 are configured to engage the elongate body 104 on the workpiece side 302 of the elongate body 104. The third connector 604 and the fourth connector 606 engage the reciprocal third and fourth connector channels 322, 324 which are formed on the workpiece side 302 of the elongate body 104. FIG. 4 shows the third connector 604 and the fourth connector 606 engaged with the reciprocal third and fourth connector channels 322, 324.

In some examples, the first connector 600, the second connector 602, the fifth connector 608 and the sixth connector 610 are configured to engage the elongate body 104 on the power tool side 304 of the elongate body 104. The first connector 600, the second connector 602, the fifth connector 608 and the sixth connector 610 engage the reciprocal first, second, fifth and sixth connector channels 314, 316, 318, 320 which are formed on the power tool side 304 of the elongate body 104. FIG. 7 shows the first connector 600, the second connector 602, the fifth connector 608 and the sixth connector 610 engaged with the reciprocal first, second, fifth and sixth connector channels 314, 316, 318, 320. FIG. 7 shows a partial plan view of the power tool guide 102.

In this way, at least some of the plurality of connectors 600, 602, 604, 606, 608, 610 engage the elongate body 104 on each side of the elongate body 104. This means that the edge protector 214 is prevented from moving with respect to the elongate body 104 in a direction perpendicular to the axis B-B or C-C as shown in FIG. 3*a* or 3*b*. FIG. 8 shows the first and second connectors 600, 602 offset from the third connector 604 on the edge protector 214 in the direction perpendicular to the axis B-B or C-C. FIG. 8 shows a partial perspective of the edge protector 214.

Turning to FIGS. 5, 7, 8 the connectors 600, 602, 604, 606, 608 and 610 will be discussed in more detail. The connectors 600, 602, 604, 606, 608 and 610 are configured to grip the walls 326, 328 of the connector channels 314, 316, 318, 320, 322, 324 to increase the friction between the connectors 600, 602, 604, 606, 608 and 610 and the walls of the connector channels 314, 316, 318, 320, 322, 324.

In some examples, the connectors 600, 602, 604, 606, 608 and 610 grip the walls 326, 328 of the connector channels 314, 316, 318, 320, 322, 324 by exerting a force against the walls 326, 328 of the connector channels 314, 316, 318, 320, 322, 324. FIG. 3*a* shows a first wall 326 and a second wall 328 of the first connector channel 314. For the purposes of clarity only the walls 326, 328 of the first connector channel 314 have been labelled. The features of the first connector 600 and the first connector channel 314 are applicable to all the connectors 600, 602, 604, 606, 608 and 610 and connector channels 314, 316, 318, 320, 322, 324.

In some examples, the first connector 600 comprises a pair of biased arms 800, 802 configured to engage walls 326, 328 of the first connection channel 314 in the elongate body 104. The biased arms 800, 802 are configured to flex together when inserted into the first connection channel 314. Once the first connector 600 is located in the first connection channel 314, the first and second arms 800, 802 exert a gripping force against the walls 326, 328.

Each of the connectors 600, 602, 604, 606, 608 and 610 comprises a pair of biased arms 800, 802 and therefore each of the connectors 600, 602, 604, 606, 608 and 610 individually provides a gripping force against the walls 326, 328 of the connector channels 314, 316, 318, 320, 322, 324. Accordingly, the edge protector 214 is fixed to the elongate body 104 across the transverse length of the elongate body 104 across the axis B-B or C-C.

In some examples, the pair of biased arms 800, 802 optionally comprise a plurality of gripping ridges 804. The gripping ridges 804 are configured to increase the frictional forces between the biased arms 800, 802 and the walls 326, 328 of the connector channel 314.

While the arrangements shown in the Figures illustrate the connectors 600, 602, 604, 606, 608 and 610 having biased arms 800, 802 providing a gripping force, in other examples the connectors 600, 602, 604, 606, 608 and 610 can comprise any suitable structure. For example, the connectors 600, 602, 604, 606, 608 and 610 do not comprise arms but can comprise a reciprocal cross-sectional shape to the connector channels 314, 316, 318, 320, 322, 324 and provide a friction fit when the connectors 600, 602, 604, 606, 608 and 610 are inserted into the connector channels 314, 316, 318, 320, 322, 324.

In some examples, additionally or alternatively one or more of the connectors 600, 602, 604, 606, 608 and 610 comprises at least one engagement peg 500 configured to engage a first reciprocal peg hole 502 in the elongate body 104. In some examples, there can be a first engagement peg 500 on a first arm surface 806 and a second engagement peg 808 on a second arm surface 810. In some examples, the first and second engagement pegs 500, 808 are mounted on different surfaces which are perpendicular. This increases the gripping force of the biased arms 800, 802 against the walls 326, 328 of the connector channel 314 in multiple directions.

In some examples, the first and second engagement pegs 500, 808 are mounted on the second connector 602. In some examples, the engagement pegs 500, 808 can be mounted on all, none, or some of the connectors 600, 602, 604, 606, 608 and 610.

The second engagement peg 808 can also be seen from FIG. 7. The second engagement peg 808 is configured to engage with a second reciprocal peg hole 700.

As mentioned above, the power tool guide 102 is connectable to another identical power tool guide (not shown). By connecting two power tool guides 102 together, the length of the predetermined path provided by the two power tool guides 102 for the power tool 100 can be increased. In order to connect the power tool guide 102 to another identical power tool guide, a connecting rod 1000 is used. The connecting rod 1000 is configured to engage with the power tool guide 102 and the other identical power tool guide.

Once the connecting rod 1000 is engaged with the power tool guide 102, the power tool guide 102, the other identical power tool guide and the connecting rod 1000 are fixed together. This means that the power tool guide 102 and the other identical power tool guide 102 can be used as a single unitary larger power tool guide.

Figure 9A:
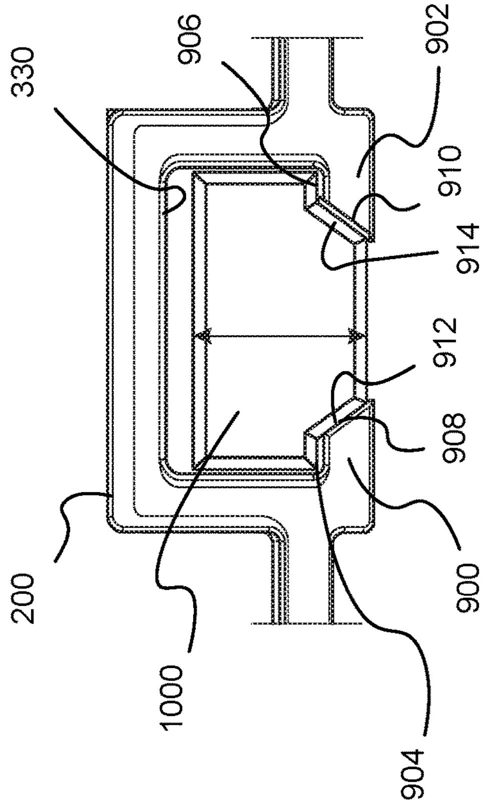
FIGS. 9*a* and 9*b* show a close-up cross-sectional view of a power tool guide according to an example embodiment.
Figure 9B:
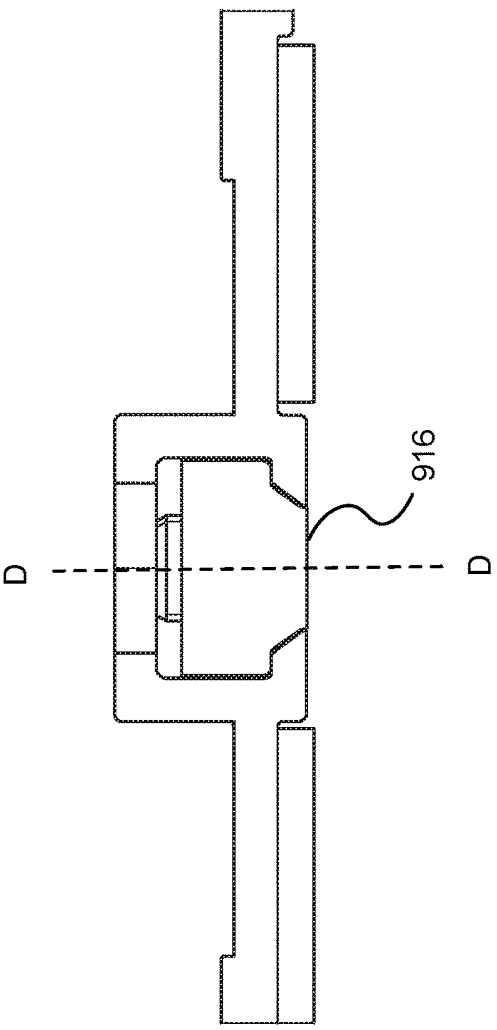
Figure 10:
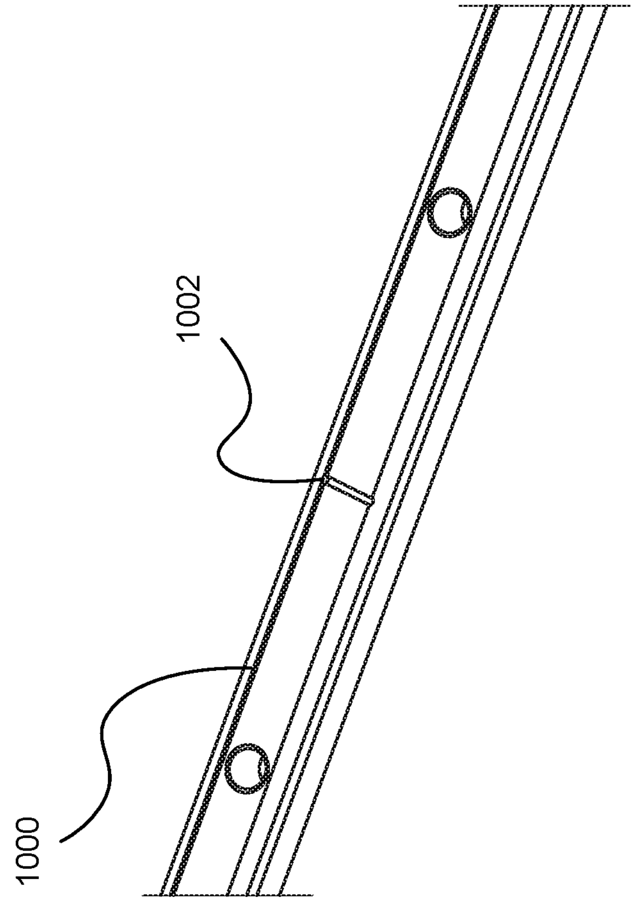
FIG. 10 shows a partial perspective view of a component of a power tool guide according to an example embodiment.
Figure 13:
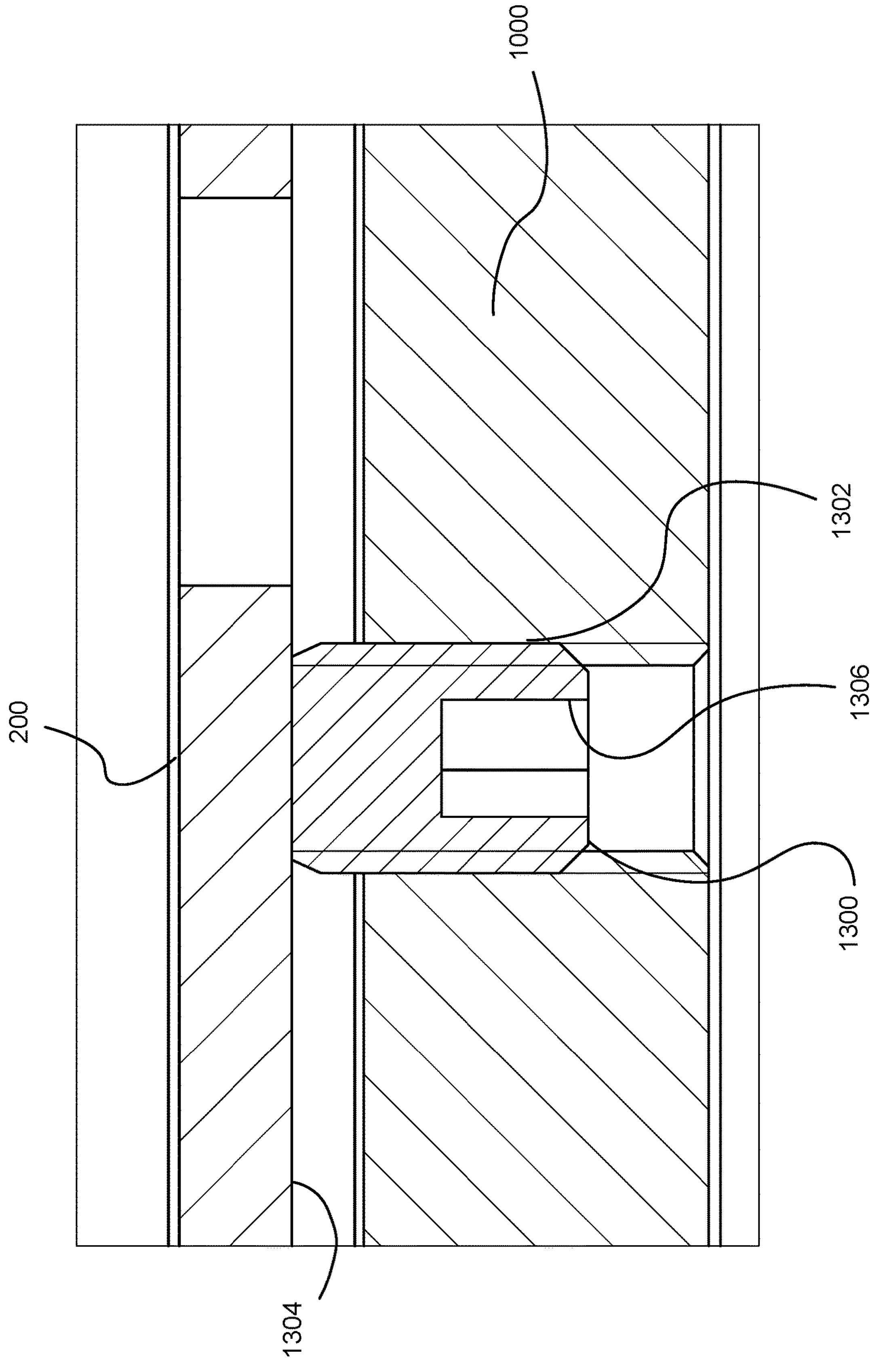
FIG. 13 shows a close-up partial cross-sectional view of a power tool guide.

The connecting rod 1000 when engaged with the elongate body 104 will now be described in more detail with respect to FIGS. 3*a*, 3*b*, 9*a*, 9*b*, 10, 11, 12 and 13. FIGS. 9*a* and 9*b* show a close-up cross-sectional view along axis B-B of the elongate body 104 when the connecting rod 1000 is mounted to the elongate body 104. FIG. 10 shows a partial perspective view of the connecting rod 1000. FIG. 13 shows a close-up partial cross-sectional view of the elongate body 104 along the axis D-D.

The elongate body 104 comprises a first connecting rod channel 330 (best shown in FIG. 3*a*) and the edge protector 214 comprises a second connecting rod channel 620 (best shown in FIG. 6). Both the first and second connecting rod channels 330, 620 are configured to receive the connecting rod 1000. Since the edge protector 214 comprises the second connecting rod channel 620, the connecting rod 1000 can be inserted and fixed to the first connecting rod channel 330 when the edge protector 214 is mounted to the elongate body 104.

As shown in FIG. 3*a*, the elongate rail 200 comprises the first connecting rod channel 330. This means that the elongate rail 200 is hollow and serves the dual purpose of providing the guide for the power tool 100 and receives the connecting rod 1000 in the first connecting rod channel 330.

Similarly, as shown in FIG. 6, the rail profile portion 406 of the edge protector 214 also comprises the second connecting rod channel 620. When the edge protector 214 is mounted to the elongate body 104, the first connecting rod channel 330 and the second connecting rod channel 620 are aligned and the connecting rod 1000 can be inserted into both the first connecting rod channel 330 and the second connecting rod channel 620 in a direction along the longitudinal axis A-A.

In some examples the first connecting rod channel 330 and the second connecting rod channel 620 are open channels. This means that the first connecting rod channel 330 and the second connecting rod channel 620 comprises a C-shaped cross-sectional profile. Accordingly, the first connecting rod channel 330 and the second connecting rod channel 620 respectively comprise a first elongate slot 332 and a second elongate slot 622. The first and second elongate slots 322, 622 allow the user to access a locking screw 1300 (best shown in FIG. 13) for fixing the connecting rod 1000 to the power tool guide 102.

Turning back to FIG. 9*a*, the connecting rod 1000 and the first connecting rod channel 330 will be discussed in more detail. The first connecting rod channel 330 comprises first and second protruding lips 900, 902 configured to engage reciprocal first and second shoulder portions 904, 906 on the at least one connecting rod 1000. The first protruding lip 900 and the second protruding lip 902 extend towards each other. The engagement of the first and second shoulder portions 904, 906 and first and second protruding lips 900, 902 increases the contact surface area between the connecting rod 1000 and the first connecting rod channel 330. Furthermore, first and second shoulder portions 904, 906 and first and second protruding lips 900, 902 prevent twisting to rotation of the connecting rod 1000 with respect to the first connecting rod channel 330. This prevents the connecting rod 1000 slipping with respect to the first connecting rod channel 330.

The first and second protruding lips 900, 902 each optionally comprise an inclined surface 908, 910. The inclined surfaces 908, 910 are inclined with respect to a plane of the elongate body 104. The inclined surfaces 908, 910 are configured to engage a first and a second reciprocal inclined surface 912, 914 on the connecting rod 1000. The engagement of the first and second shoulder portions 904, 906 and first and second protruding lips 900, 902 at the inclined surfaces 908, 910, 912, 914 further increases the contact surface area between the connecting rod 1000 and the first connecting rod channel 330. This increases the frictional forces between the connecting rod 1000 and the first connecting rod channel 330.

Turning to FIG. 13, the locking mechanism will be discussed in more detail. As mentioned above, the elongate body 104 comprises at least one locking screw 1300 configured to fix the at least one connecting rod 1000 with respect to the elongate body 104. The locking screw 1300 is mounted in a threaded hole 1302 in the connecting rod 1000. The locking screw 1300 is configured to engage the upper surface 1304 of the first connecting rod channel 330. The locking screw 1300 then urges first and second shoulder portions 904, 906 on the connecting rod 1000 against the first and second protruding lips 900, 902. In some examples there can be a plurality of locking screws 1300 along the connecting rod 1000 to secure the connecting rod 1000 to the first connecting rod channel 330 at different points along the longitudinal axis A-A.

The locking screw 1300 comprises a tool hole 1306 configured to receive a tool (not shown). The tool hole 1306 in some examples is hexagonal, Torx shaped, square, or cross-headed screw hole or any other hole for a suitable tool. The tool hole 1306 is accessible from the first or second elongate slot 332, 622 in the elongate body 104 or the edge protector 214.

In some examples, the connecting rod 1000 comprises at least one alignment indication 1002 configured to indicate a position of the connecting rod 1000 with respect to the power tool guide 102 when mounted within the first connecting rod channel 330.

In some examples the alignment indication 1002 is located at a centre point of the connecting rod 1000. In some other examples, the alignment indication 1002 is part way along the connecting rod 1000 closer to an end of the connecting rod 1000 than the center point. In some examples, the alignment indication 1002 is a notch 1002 in the lower surface 916 of the connecting rod 1000 which is visible through the first elongate slot 332 of the first connecting rod channel 330. This means that the user can align the connecting rod 1000 in the first connecting rod channel 330 and then move the notch 1002 so that it is aligned between the power tool guide 102 and the other power tool guide.

In another example, two or more examples are combined. Features of one example can be combined with features of other examples.

Examples of the present disclosure have been discussed with particular reference to the examples illustrated. However, it will be appreciated that variations and modifications may be made to the examples described within the scope of the disclosure.

The invention claimed is:

1. A power tool guide comprising:
an elongate body having a workpiece side configured to engage a workpiece and a power tool side configured to engage a power tool; and
at least one elongate rail mounted on the power tool side, the at least one elongate rail configured to engage a reciprocal channel in the power tool and limit lateral movement of the power tool in a direction perpendicular to a longitudinal axis of the elongate body;
wherein the at least one elongate rail comprises a width reduction that includes a first external width in a direction perpendicular to the longitudinal axis at a longitudinal end of the at least one elongate rail and a second external width in a direction perpendicular to the longitudinal axis at a longitudinal position spaced along the longitudinal axis from the longitudinal end of the at least one elongate rail, wherein the second external width is greater than the first external width.

2. The power tool guide, as recited in claim 1, wherein the at least one elongate rail varies in width from the longitudinal end to the longitudinal position.

3. The power tool guide, as recited in claim 1, wherein the at least one elongate rail comprises chamfered walls between the longitudinal end and the longitudinal position.

4. The power tool guide, as recited in claim 1, wherein the first external width and the second external width are smaller than a third width of the reciprocal channel.

5. The power tool guide, as recited in claim 1, wherein the longitudinal end is a first longitudinal end and the longitudinal position is a first longitudinal position, the at least one elongate rail including the first external width at a second longitudinal end of the at least one elongate rail and the second external width at a second longitudinal position remote from the second longitudinal end of the at least one elongate rail.

6. The power tool guide, as recited in claim 1, wherein the power tool guide comprises an edge protector removably connectable to the longitudinal end of the at least one elongate rail.

7. The power tool guide, as recited in claim 6, wherein the edge protector comprises at least one rail profile portion configured to align with the at least one elongate rail.

8. The power tool guide, as recited in claim 7, wherein the at least one rail profile portion comprises a width equal to or less than the first external width of the at least one elongate rail.

9. The power tool guide, as recited in claim 1, wherein at least one elongate sliding surface is mounted on the power tool side and remote from the at least one elongate rail.

10. The power tool guide, as recited in claim 9, wherein the at least one elongate sliding surface comprises a first elongate sliding surface and a second elongate sliding surface.

11. The power tool guide, as recited in claim 10, wherein the at least one elongate rail is between the first elongate sliding surface and the second elongate sliding surface.

12. The power tool guide, as recited in claim 10, wherein the first elongate sliding surface and the second elongate sliding surface are closer to a periphery of the elongate body than the at least one elongate rail.

13. The power tool guide, as recited in claim 1, wherein the at least one elongate rail is mounted along a center axis of the elongate body.

14. A power tool guide assembly comprising:
the power tool guide of claim 1; and
a power tool mounted on the power tool guide;
wherein a length of the width reduction along the longitudinal axis between the longitudinal end and the longitudinal position is less than a length of the reciprocal channel of the power tool, such that the reciprocal channel remains in contact with a portion of the at least one elongate rail having the second external width.

15. The power tool guide, as recited in claim 1, wherein the first longitudinal end of the at least one elongate rail is substantially aligned with a longitudinal end of the elongate body.

16. The power tool guide, as recited in claim 1, wherein the first longitudinal end of the at least one elongate rail is substantially flat.

17. The power tool guide, as recited in claim 3, wherein the chamfered walls are substantially straight between the longitudinal end and the longitudinal position.

18. The power tool guide, as recited in claim 7, wherein an end of the at least one rail profile portion of the edge protector has a shape that is complementary to a shape of the longitudinal end of the at least one elongate rail and the end of the at least one rail profile portion abuts the longitudinal end of the at least one elongate rail.

19. The power tool guide, as recited in claim 18, wherein the end of the at least one rail profile portion is flat.

20. The power tool guide, as recited in claim 8, further comprising a connecting rod, wherein:

an inner wall of the at least one elongate rail defines a first connecting rod channel;

an inner wall of the at least one rail profile portion defines a second connecting rod channel;

when the edge protector is mounted to the elongate body, the first connecting rod channel and the second connecting rod channel are aligned and the connecting rod is insertable through the first connecting rod channel and the second connecting rod channel.

* * * * *